United States Patent [19]
Fisher et al.

[11] Patent Number: 5,558,283
[45] Date of Patent: Sep. 24, 1996

[54] COFFEE GRINDER DEVICE WITH FEED WORM AND REVERSED GRINDING BURR POSITIONING

[75] Inventors: Charles M. Fisher, Louisville, Ky.; Robert C. McNeill, Jeffersonville, Ind.

[73] Assignee: Grindmaster Corporation, Louisville, Ky.

[21] Appl. No.: 437,596

[22] Filed: May 9, 1995

[51] Int. Cl.[6] ........................ A47J 42/18
[52] U.S. Cl. .................. 241/100; 241/247; 241/261.2; 241/259.3; 241/290
[58] Field of Search ................ 241/290, 245, 241/246, 247, 261.2, 261.3, 100, 259.1, 259.2, 259.3

[56] References Cited

U.S. PATENT DOCUMENTS

| | | | |
|---|---|---|---|
| 1,485,855 | 3/1924 | Kidney | 241/261.2 X |
| 1,989,416 | 1/1935 | Hartman | 241/261.2 X |
| 4,201,349 | 5/1980 | Walsh | 241/261.2 X |
| 4,967,649 | 11/1990 | Ephraim et al. | 241/261.2 X |

FOREIGN PATENT DOCUMENTS

| | | | |
|---|---|---|---|
| 3303960 | 6/1984 | Germany | 241/261.2 |
| 3904909 | 1/1990 | Germany | 241/261.2 |

*Primary Examiner*—Mark Rosenbaum
*Attorney, Agent, or Firm*—Wheat, Camoriano, Smith & Beres, PLC

[57] ABSTRACT

A coffee grinding apparatus for grinding coffee beans and distributing said beans into a basket for subsequent brewing of coffee having a pair of grinding disks where one of the disks is fixed to the housing and has an annular configuration with a central opening and the other disk further removed from the rotates with the drive shaft of the grinder motor. However, the rotating disk is mounted to the shaft so that it rotates with but is free to axially slide along the drive shaft. A coffee bean feed drive is mounted over the distal end of the drive shaft and moves coffee beans from the opening at the front end of the housing through the central opening of the stationary grinding burr. The feed drive is mounted to the shaft so that it rotates with but is also free to slide axially along the shaft. An adjusting mechanism is positioned adjacent to one end of the feed drive and functions to move the feed drive relative to the drive shaft. A biasing element yieldably biases the rotating burr in a direction toward the stationary grinding burr and the distal end of the drive shaft thereby causing the feed drive to continuously abut the adjusting mechanism. The yieldably biasing element permits the gap between burrs to widen during grinding in the event jamming is experienced.

10 Claims, 3 Drawing Sheets

COFFEE GRINDER DEVICE WITH FEED WORM AND REVERSED GRINDING BURR POSITIONING

BACKGROUND OF THE INVENTION

This invention relates to a coffee grinder apparatus and more particularly to a coffee grinder apparatus which may be used in combination with a coffee brewer and having a feed worm or auger for feeding the coffee beans from a coffee bean hopper inlet to a set of spring biased grinding burrs.

A typical commercial prior art coffee grinder comprises a hopper for the storage of coffee beans and has an outlet, generally disposed at the bottom of the hopper, communicating with a passageway to a set of grinding burrs. The burrs are generally in the shape of closely positioned disks with facing surfaces provided with meshing teeth or blades that function to grind the beans into ground coffee. A rotatable auger or feed worm is often positioned in the passageway to move the beans from the outlet to the grinding burrs. One of the burrs is generally held stationary while the other burr is rotated on a shaft driven by a grinding motor. Frequently, the feed worm is mounted on the same drive shaft as the rotatable burr for concurrent rotation by the grinding motor.

Most prior art coffee bean grinders of the type described above position the stationary burr of the burr set closer to the grinding motor. The coffee bean outlet communicates with the passageway at a point between the grinding motor and the stationary burr. The feed worm moves the beans away from the motor through an annulus opening in the stationary burr where the beans are then ground and are spun out of the grinder into a container or brew basket for subsequent brewing. Additionally, the spacing between the burrs can be altered by moving a flange supporting the stationary burr axial toward or away from the rotatable burr.

The consistency in grinding depends in part on the concentricity of the burr set. That is, it is desirable that the planes of the burrs are maintained in as parallel relationship as practically possible. Failure to maintain the proper alignment reduces grind consistency. Additionally, the separation of the burr faces plays a role in the quality of the ground coffee. When beans are being fed into the spacing between the burrs, certain types of coffee grounds are not able to clear the burrs fast enough and the burrs begin to jam. Due to friction, ground coffee temperatures may become elevated causing the grounds to burn and flash off some of the flavored oils.

The positioning of the grinding burrs of the prior art described above, however, often creates problems in maintaining the aforementioned grinding consistency and quality of the ground coffee. Because the prior art generally places the rotatable burr at the end of the shaft extending from the motor, the burr faces can become misaligned easily as the positioning magnifies the effect of shaft misalignment, i.e., shaft run out, and bearing end play. Additionally, the burrs cannot accommodate certain types of coffee beans being ground and jamming occurs resulting in flavor distortion as discussed above. To alleviate or minimize this problem, strict attention must be given to closely controlling motor or shaft tolerances, thus adding significantly to the cost of the apparatus.

U.S. Pat. No. 1,989,416 to Hartman describes a grinding apparatus which has a "feeding scroll" that feeds coffee beans from a supply duct to the grinding disks in which the rotatable grinding burr is positioned inwardly of the apparatus with respect to the stationary burr. The rotatable grinding burr of the Hartman patent is driven by a shaft keyed to a worm wheel engaging an actuating worm mounted on the grinder motor drive shaft. Thus the grinding motor is at a right angle to the rotatable burr drive shaft. Additionally, the Hartman patent describes the burrs as being adjustable axially. However, the adjustment is solely done manually through the turning of a ratchet to move the stationary burr to and from the rotatable burr.

It is therefor an object of the present invention to provide for a coffee bean grinding apparatus in which the burrs are self adjusting during the grinding operation.

It is still another object of the present invention to provide for a coffee bean grinding apparatus in which misalignment of the grinding burrs is minimized.

It is still a further object of the present invention to provide for a coffee bean grinding apparatus that positions the grinder closer to the front of the apparatus, permits the grinder motor to directly drive the rotatable grinding burr, and places the rotatable burr close to the grinder motor to reduce misalignment of the burrs.

SUMMARY OF THE INVENTION

A coffee grinding apparatus for grinding coffee beans and distributing said beans into a basket for subsequent brewing of coffee comprises, in part, a hopper for the storage of coffee beans and a grinder housing positioned below the hopper. An opening in the top of the housing at front end thereof serves to allow beans to enter into the housing. The grinder housing encloses a pair of grinding disks or burrs having opposing surfaces provided with grinding configurations. One of the burrs is fixed to the housing and has an annular configuration with a central opening. A grinder motor is positioned directly adjacent the housing and has a drive shaft extending into the grinder housing. A coffee bean feed drive is mounted over the distal end of the drive shaft and moves coffee beans from the opening at the front end of the housing through the central opening of the stationary grinding burr. The feed drive is mounted to the shaft so that it rotates with but is also free to slide axially along the shaft. An adjusting mechanism is positioned adjacent to one end of the feed drive and functions to move the feed drive relative to the drive shaft. The rotating burr is fixed to the feed drive and thus rotates with the drive and shaft. A biasing element yieldably biases the rotating burr in a direction toward the stationary grinding burr and the distal end of the drive shaft thereby causing the feed drive to continuously abut the adjusting mechanism. The yieldably biasing element permits the gap between burrs to widen during grinding in the event jamming is experienced.

DETAILED DESCRIPTION OF THE PREFERRED EMBODIMENT

Figure 1:
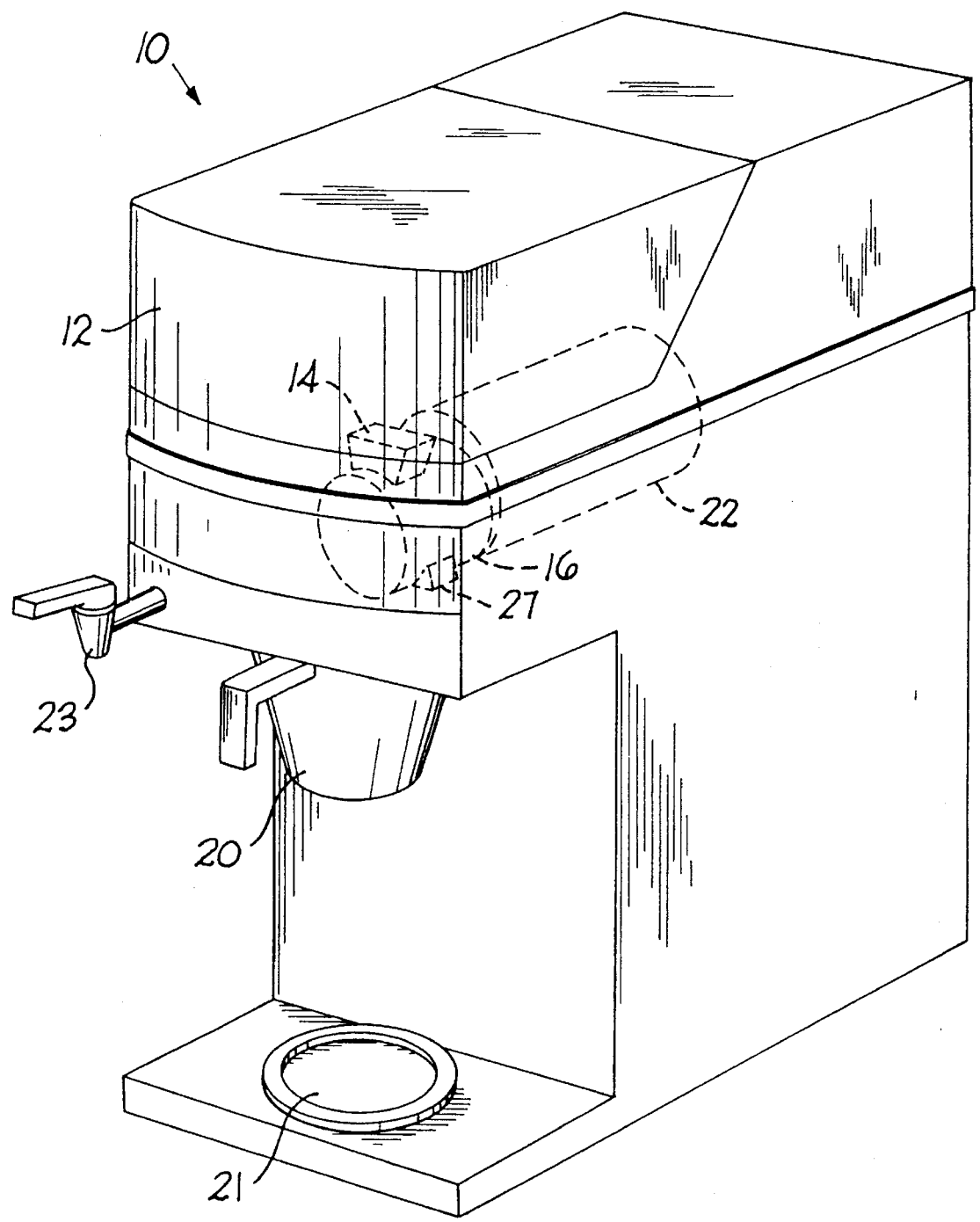
FIG. 1 is a perspective view of the grinding apparatus of the present invention showing in dashed lines the grinder housing and grinder motor within said apparatus and a ground coffee receiving container positioned beneath the apparatus in accordance with the present invention.

An apparatus in accordance with the present invention is shown in the perspective of FIG. 1 wherein the apparatus is shown generally by character numeral 10. A hopper 12 is positioned above a grinding head 16 and a grinder motor 22 (both shown in dashed lines) so that it communicates directly with the funnel 14 feeding into grinder head 16. A brew basket 20 is releasably secured beneath apparatus 10 and a distribution chamber 27 in a manner well known in the prior art such as shown in copending application and commonly assigned application Ser. No. 08/438,175, filed May 9, 1995. Apparatus 10 which may be part of a combination grinder brewer is also provided with a hot plate 21 on which a decanter (not shown) may be seated and a spigot 23.

Figure 2:
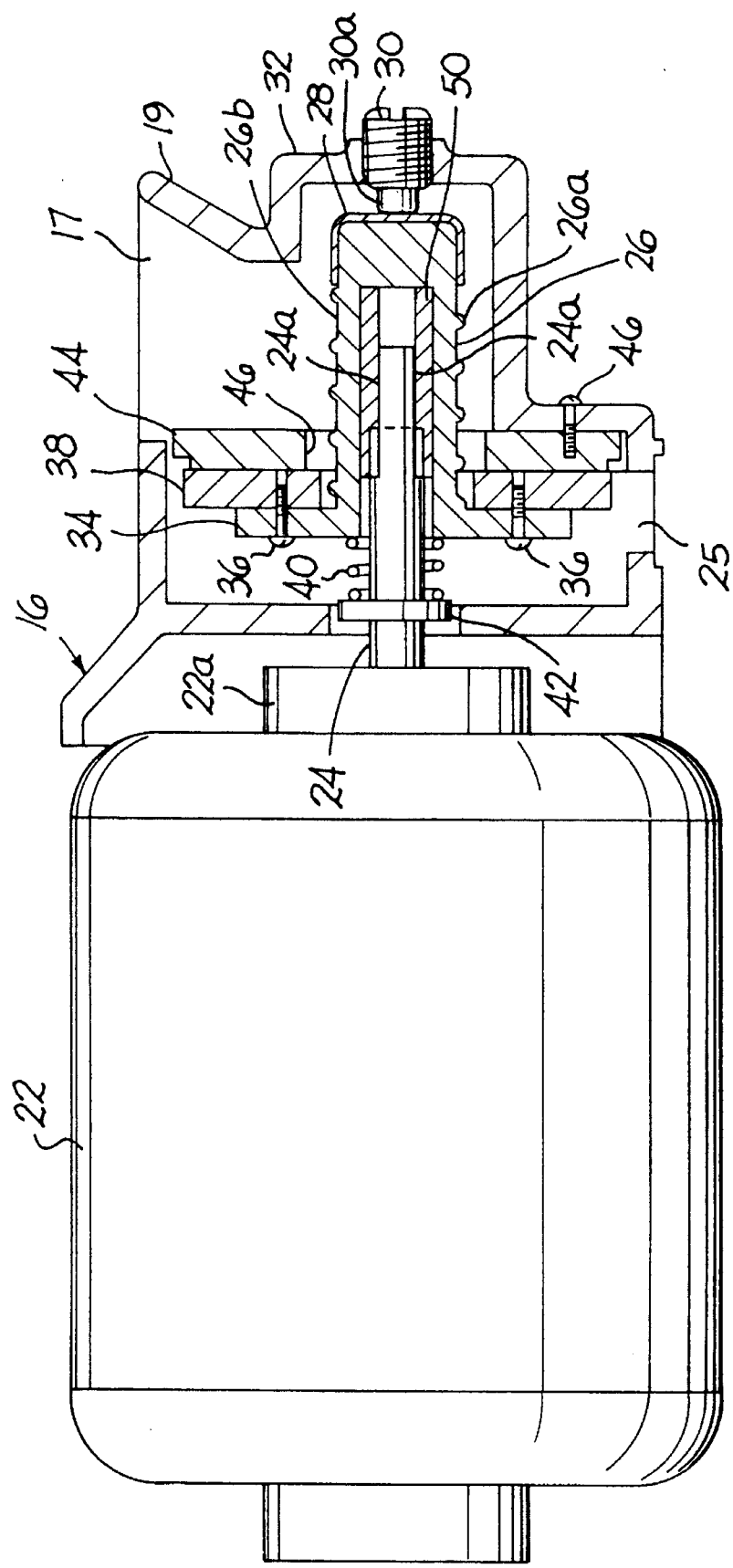
FIG. 2 is a side sectional view of the grinding apparatus of the present invention illustrating an abutting positioning of the grinding burrs and the respective positioning of the passageways for the coffee beans and ground coffee.
Figure 3:
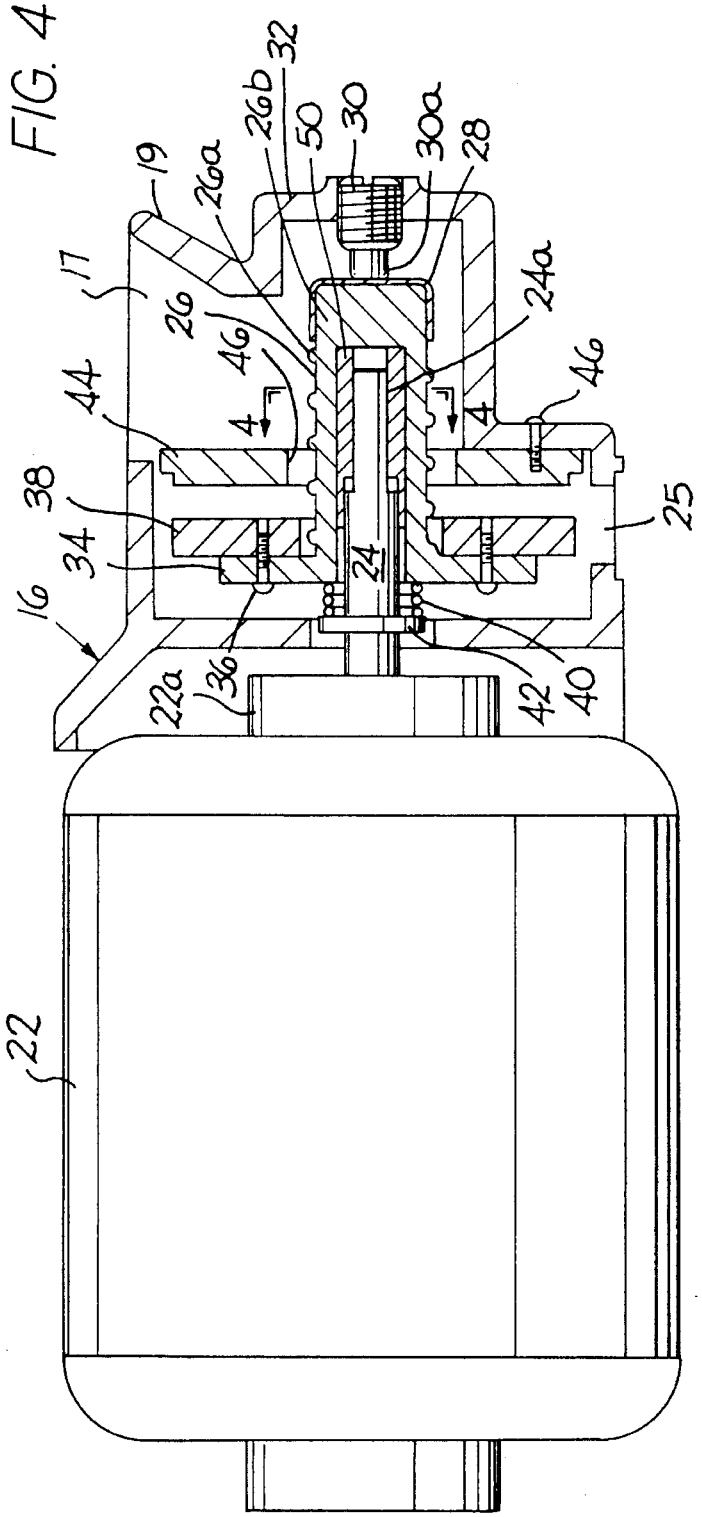
FIG. 3 is a side sectional view like that shown in FIG. 2 with the grinding burrs separated showing the axial translation of the coffee bean feed mechanism and rotating grinding burr with respect to the stationary grinding burr.

Referring now to FIGS. 2 and 3, it should be noted that opening 17 communicating with funnel 14 (seen in FIG. 1) is located adjacent front wall 19 of housing 16. Thus, coffee beans entering housing 16 from hopper 12 are urged along a passageway within housing 16 in the direction of the grinder motor 22. Ground coffee exits housing 16 at an opening 25 at the rear of housing 16 leading into a coffee distribution chamber 27 that may serve, among other functions, to distribute coffee into brew basket 20.

As will be discussed in more detail below, the movement of coffee beans toward the rear of housing 16 permits the positioning of the rotating burr of the grinding burr set closer to motor 22, reducing tolerance requirements while maintaining proper burr alignment. This configuration permits the use of a direct drive from the grinder motor rather than a right angle drive mechanism such as shown in U.S. Pat. No. 1,989,416 discussed above.

The components permitting this advantageous positioning are best described with respect to FIGS. 2 and 3. Grinder motor 22 is connected to a drive shaft 24 extending into grinder housing 16. An auger or feed worm 26 with spiral flights 26a encloses and is keyed to shaft 24 such that it rotates with but can be moved axially relative to shaft 24. The end of feed worm 26 may be capped with an abutting cap 28. An adjusting screw 30 is appropriately rotatably journaled into the end wall 32 of grinder housing 16 and has a shaft 30a that abuts cap 28. The other end of feed worm 26 has a circular flange 34 that abuts and is secured by a plurality of fasteners 36 to a burr disk 38. Thus, disk 38 rotates with feed worm 26 and drive shaft 24. Mounted about drive shaft 24 is a helical spring 40 abutting flange 34 and a bearing ring 42 in a press fit relationship with shaft 24. Alternatively, shaft 24 could be provided with an integral shoulder against which spring 20 could abut. Spring 40 functions to urge flange 34 and burr disk 38 to the right or away from motor 22. An annularly shaped grinding burr disk 44 with its grinding surface facing disk 38 is fixed with respect to the grinder housing 16 by any appropriate means such as metal screws 46. Disk 44 has a central opening through which feed worm 26 extends.

Opening 17 into the grinder housing from funnel 14 is directly above distal end 26b of feed worm 26. The opening 25 into distribution chamber 27 leading to brew basket 20 is to the left or toward grinder motor 22. Because rotatable burr disk is located close to motor 22 as opposed to being positioned nearer the end of shaft 24, the eccentricities provided to shaft 24 due to misalignment at its motor bearing 22a becomes less significant and the alignment of the grinding surfaces is not greatly affected. This seemingly small change can have a significant effect on the quality of the grounds distributed to the basket. Additionally, larger tolerances for proper operation can be accommodated than prior art grinding devices which translates into significant cost savings since the grinding motor is easier to produce.

Figure 4:
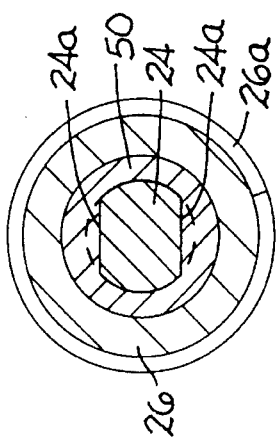
FIG. 4 is a sectional view taken along lines 4—4 of FIG. 3 showing the keying of the shaft to an element linking the rotating burr to the shaft.

Worm gear 26 is secured by a slot and groove arrangement to a slide linkage 50 which in turn is keyed to shaft 24. As best seen in FIG. 4, shaft 24, for example, may be provided with flat surfaces 24a and the bore of linkage 50 provided with a complimentary flat interior surface. In this manner, linkage 50 is capable of axially sliding along but is constrained to rotate with shaft 24. Alternatively, linkage 50 may be omitted and the bore of worm gear 26 be made complimentary to shaft 24.

In operation, the appropriate spacing and tension between rotatable burr 38 and stationary burr 44 are set by rotating screw 30. Motor 22 is energized and coffee beans are fed on command from hopper 12 into funnel 14. Feed worm 26 rotating with shaft 24 carries the beans through the annular opening within stationary burr 44 where the beans are then ground between burrs 38 and burr 44 to the proper consistency. The ground coffee is thrust out through opening 25 and distributed into brew basket 20. In the event that jamming should occur, burr 38 and the entire worm gear assembly keyed to linkage 50 moves along shaft 24, temporarily compressing spring 40. The movement of the burrs away from each other reduces the chance of burning of the ground coffee and concomitant deleterious effects on the coffee flavor.

It is understood that in light of a reading of the foregoing description and drawings that those with ordinary skill in the art will be able to make changes and modifications to the present invention without departing from the spirit or scope of the invention as defined in the following appended claims.

We claim:

1. In a coffee grinder apparatus having a coffee bean storage container, (a) a grinder housing having a first passageway communicating with said storage container, said housing enclosing first and second grinding burrs, said first grinding burr being stationary with respect to said housing;

(b) a grinder motor having a shaft extending into said housing and mounting for rotation said second grinding burr, said second grinding burr being located closer to said motor than said first grinding burr and being axially movable with respect to said first grinding burr;

(c) a coffee bean feed mechanism mounted on said shaft for feeding beans received from said storage container to said grinding burrs;

(d) a biasing element biasing said second grinding burr toward said first grinding burr; and (e) a second passageway providing egress from said grinder housing for ground coffee ground by said grinding burrs, said second passageway located closer to said motor than said first passageway.

2. The grinder apparatus of claim 1 in which the grinder motor and shaft are directly connected.

3. The grinder apparatus of claim 1 in which the second grinding burr is fixed to the feed mechanism and rotates therewith.

4. The grinder apparatus of claim 3 in which the biasing element is a helical spring mounted about said shaft and abutting said second grinding burr.

5. The grinder apparatus of claim 4 including an adjusting mechanism for moving said feed mechanism and said second grinding burr axially with respect to said shaft.

6. The grinder apparatus of claim 5 in which said adjusting mechanism includes a manually adjustable screw rotatably mounted to said housing, abutting one end of said feed mechanism, and moving said feed mechanism along said shaft when rotated, said helical spring urging said feed mechanism against said adjustable screw.

7. A coffee grinding apparatus for grinding coffee beans and distributing said beans into a basket for subsequent brewing of coffee comprising (a) a hopper for the storage of coffee beans;
   (b) a grinder housing positioned below said hopper and communicating therewith through a first passageway, said grinder housing enclosing first and second grinding burrs, said first grinding burr having an annular configuration with a central opening and fixed stationary with respect to said housing;
   (c) a grinder motor and a drive shaft extending from said motor into said grinder housing and having a free distal end;
   (d) a coffee bean feed drive positioned within said housing extending from said passageway through said central opening in said first burr, said feed drive mounted on said drive shaft and over said distal end thereof for rotational movement therewith and axially sliding movement along said shaft, said second burr fixed to one end of said feed drive between said first burr and said grinder motor;
   (e) a biasing element for biasing said second burr toward said first burr; and
   (d) an adjusting element rotatably mounted to said housing for abutting an other end of said feed mechanism for moving said feed mechanism and said second burr axially along said shaft from said distal end thereof against the bias of said biasing element.

8. The apparatus of claim 7 including a link element keyed to said shaft along its distal end for rotational movement and slidable along said shaft in said axially direction, said feed mechanism fixed to said link mechanism.

9. The apparatus of claim 8 in which said feed mechanism is a feed worm having spiral flights to move said beans to said burrs, said feed worm having a flange abutting and fixed to said first burr, said biasing element being a helical spring abutting said flange and a biasing shoulder fixed to said shaft.

10. The apparatus of claim 9 in which said housing has a second passageway communicating with a coffee ground receiving container, said second passageway located adjacent to and below said grinding burrs, said first passageway located above said distal end of said drive shaft whereby said coffee beans are moved from said first passageway in a direction toward said grinder motor through said central opening of said first burr and are ground by said burrs into ground coffee and the ground coffee exits through second passageway into said receiving container.

\* \* \* \* \*